(12) United States Patent
Wang et al.

(10) Patent No.: US 11,848,422 B2
(45) Date of Patent: Dec. 19, 2023

(54) ELECTROCHEMICAL DEVICE AND ELECTRONIC DEVICE

(71) Applicant: Dongguan Poweramp Technology Limited, Dongguan (CN)

(72) Inventors: Huixin Wang, Dongguan (CN); Bingmei Feng, Dongguan (CN); Chunhua Bian, Dongguan (CN); Ying Wang, Dongguan (CN)

(73) Assignee: Dongguan Poweramp Technology Limited, Dongguan (CN)

( * ) Notice: Subject to any disclaimer, the term of this patent is extended or adjusted under 35 U.S.C. 154(b) by 223 days.

(21) Appl. No.: 17/399,218

(22) Filed: Aug. 11, 2021

(65) Prior Publication Data

US 2022/0052386 A1 Feb. 17, 2022

(30) Foreign Application Priority Data

Aug. 13, 2020 (CN) .......................... 202010814487.2

(51) Int. Cl.
*H01M 10/0587* (2010.01)
*H01M 4/13* (2010.01)
(Continued)

(52) U.S. Cl.
CPC ......... *H01M 10/0587* (2013.01); *H01M 4/13* (2013.01); *H01M 10/0525* (2013.01); *H01M 2010/4292* (2013.01)

(58) Field of Classification Search
None
See application file for complete search history.

(56) References Cited

U.S. PATENT DOCUMENTS

| 2005/0106464 A1* | 5/2005 | Yoshida | ................ H01M 4/134 429/231.95 |
|---|---|---|---|
| 2014/0141303 A1 | 5/2014 | Matsushita et al. | |

(Continued)

FOREIGN PATENT DOCUMENTS

| CN | 103825044 B | 6/2016 |
|---|---|---|
| CN | 105958124 A | 9/2016 |

(Continued)

OTHER PUBLICATIONS

Office Action dated May 7, 2021, issued in counterpart CN application No. 202010814487.2, with English translation. (16 pages).

(Continued)

*Primary Examiner* — Eli S Mekhlin
(74) *Attorney, Agent, or Firm* — WHDA, LLP (57) ABSTRACT

An electrochemical including an electrode assembly. The electrode assembly includes a negative electrode plate, a positive electrode plate, and a separator. The negative electrode plate includes a negative current collector. The negative current collector includes a first part and a second part. A first negative active material layer is disposed on one side of the first part. A second negative active material layer and a third negative active material layer are disposed on two sides of the second part respectively. The positive electrode plate includes a positive current collector. The positive current collector includes a third part and a fourth part. A first positive active material layer is disposed on the third part. A second positive active material layer is disposed on the fourth part.

17 Claims, 5 Drawing Sheets

(51) Int. Cl.
   *H01M 10/0525*   (2010.01)
   *H01M 10/42*   (2006.01)

(56) References Cited

U.S. PATENT DOCUMENTS

| | | | |
|---|---|---|---|
| 2016/0126528 A1* | 5/2016 | Park | H01M 50/557 |
| | | | 429/94 |
| 2019/0305356 A1 | 10/2019 | Chang et al. | |
| 2019/0326626 A1 | 10/2019 | Kano et al. | |
| 2020/0099098 A1 | 3/2020 | Wang et al. | |
| 2020/0313171 A1* | 10/2020 | Wang | H01M 10/052 |
| 2020/0313176 A1 | 10/2020 | Wang et al. | |
| 2020/0313186 A1 | 10/2020 | Wang et al. | |
| 2022/0069284 A1 | 3/2022 | Yang et al. | |
| 2022/0223851 A1 | 7/2022 | Yi et al. | |

FOREIGN PATENT DOCUMENTS

| | | |
|---|---|---|
| CN | 108258193 A | 7/2018 |
| CN | 109301326 A | 2/2019 |
| CN | 109841794 A | 6/2019 |
| CN | 109980177 A | 7/2019 |
| CN | 109980178 A | 7/2019 |
| CN | 109983609 A | 7/2019 |
| CN | 110010902 A | 7/2019 |
| CN | 111029527 A | 4/2020 |
| CN | 111384405 A | 7/2020 |
| CN | 111463402 A | 7/2020 |
| JP | 2005-317309 A | 11/2005 |

OTHER PUBLICATIONS

Notice of Allowance dated Mar. 2, 2022, issued in counterpart CN Application No. 202010814487.2. (4 page).

* cited by examiner

ELECTROCHEMICAL DEVICE AND ELECTRONIC DEVICE

CROSS-REFERENCE TO RELATED APPLICATIONS

This application claims priority to Chinese Patent Application No. 202010814487.2, filed on Aug. 13, 2020 and entitled "JELLY-ROLL BATTERY CELL, ELECTROCHEMICAL DEVICE, AND ELECTRONIC DEVICE", which is incorporated herein by reference in its entirety.

TECHNICAL FIELD

This application relates to the technical field of energy storage, and in particular, to an electrochemical device and an electronic device.

BACKGROUND

With popularization of consumer electronics products such as a notebook computer, a mobile phone, a handheld game console, a tablet computer, a mobile power supply, and an unmanned aerial vehicle, people are posing higher requirements on an electrochemical device (such as a lithium-ion battery).

However, safety of the electrochemical device still cannot be ensured effectively. For example, after the lithium-ion battery undergoes charge and discharge cycles in a long period, lithium will be precipitated on a surface of an electrode plate, especially a negative electrode plate, of the lithium-ion battery to form lithium dendrites. The lithium dendrites pierce a separator between the negative electrode plate and a positive electrode plate. Consequently, the negative electrode plate is in direct contact with the positive electrode plate, thereby leading to an electrochemical short circuit and deteriorating safety of a battery cell.

SUMMARY

To solve the foregoing disadvantages of the prior art, it is necessary to provide an electrochemical device that helps to reduce risks of lithium plating on an electrode plate and improve safety.

In addition, it is necessary to provide an electronic device containing the electrochemical device.

This application provides an electrochemical device, including an electrode assembly. The electrode assembly includes a negative electrode plate, a positive electrode plate, and a separator. The negative electrode plate, the separator, and the positive electrode plate are stacked and wound.

The negative electrode plate includes a negative current collector. The negative current collector includes a first part and a second part. The first part and the second part are sequentially connected in a winding direction. A first negative active material layer is disposed on one side of the first part, and no negative active material layer is disposed on the other side. A second negative active material layer and a third negative active material layer are disposed on two sides of the second part respectively. The first negative active material layer and the second negative active material layer are located on an identical side of the negative current collector.

The positive electrode plate includes a positive current collector. The positive current collector includes a third part and a fourth part. A first positive active material layer is disposed on the third part. A second positive active material layer is disposed on the fourth part. The first positive active material layer faces the first negative active material layer. The second positive active material layer faces the second negative active material layer.

A ratio of a capacity per unit area of the first negative active material layer to a capacity per unit area of the first positive active material layer is $CB_1$, a ratio of a capacity per unit area of the second negative active material layer to a capacity per unit area of the second positive active material layer is $CB_2$, and $CB_1$ is greater than $CB_2$.

Generally, $CB_1$ is equal to $CB_2$. In this application, $CB_1$ is set to be greater than $CB_2$. That is, the CB is further increased on the basis of $CB_1$, thereby reducing risks of forming lithium dendrites on the surface of the first negative active material layer and improving safety.

In some embodiments of this application, the capacity per unit area of the first negative active material layer is greater than the capacity per unit area of the second negative active material layer. Therefore, when an identical quantity of lithium ions are deintercalated from a unit area of the first positive active material layer and from a unit area of the second positive active material layer separately, an active material per unit area of the first negative active material layer is more capable of intercalating lithium ions, thereby reducing risks of lithium plating on the first negative active material layer.

In some embodiments of this application, the first negative active material layer includes a first negative active material. The second negative active material layer includes a second negative active material. A specific capacity of the first negative active material is greater than a specific capacity of the second negative active material.

In some embodiments of this application, the first negative active material layer further includes the second negative active material.

In some embodiments of this application, the capacity per unit area of the first positive active material layer is less than the capacity per unit area of the second positive active material layer.

In some embodiments of this application, the first positive active material layer includes a first positive active material. The second positive active material layer includes a second positive active material. A specific capacity of the first positive active material is less than a specific capacity of the second positive active material. Therefore, fewer lithium ions can be deintercalated from a unit area of the first positive active material layer than from a unit area of the second positive active material layer, and just such fewer lithium ions need to be intercalated into a unit area of the first negative active material layer, thereby also reducing risks of lithium plating on the first negative active material layer.

In some embodiments of this application, the first positive active material layer further includes the second positive active material.

In some embodiments of this application, the positive current collector further includes a fifth part. The fourth part is located between the third part and the fifth part. No positive active material layer is disposed on the fifth part, and the fifth part is located on an outermost circle of the electrode assembly.

In some embodiments of this application, the negative current collector further includes a sixth part. No negative active material layer is disposed on the sixth part, and the first part is located between the sixth part and the second part.

This application further provides an electronic device, including the electrochemical device described above.

REFERENCE NUMERALS

Electrode assembly 1
Electronic device 2
Negative electrode plate 10
Negative current collector 11
Positive electrode plate 20
Positive current collector 21
Separator 30
Finishing adhesive 40
Electrochemical device 100
Housing 101
First part 111
Second part 112
Sixth part 113
First negative active material layer 121
Second negative active material layer 122
Third negative active material layer 123
Third part 211
Fourth part 212
Fifth part 213
First positive active material layer 221
Second positive active material layer 222
Third positive active material layer 223

This application is further described below with reference to the following specific embodiments and the foregoing drawings.

DETAILED DESCRIPTION OF EMBODIMENTS

The following clearly and fully describes the technical solutions in the embodiments of this application with reference to the drawings hereof. Apparently, the described embodiments are merely a part of but not all of the embodiments of this application.

Unless otherwise defined, all technical and scientific terms used herein have the same meanings as usually understood by a person skilled in the technical field of this application. The terms used in the specification of this application herein are merely intended for describing specific embodiments but are not intended to limit this application.

The following describes some embodiments of this application in detail with reference to drawings. To the extent that no conflict occurs, the following embodiments and the features in the embodiments may be combined with each other.

Figure 1:
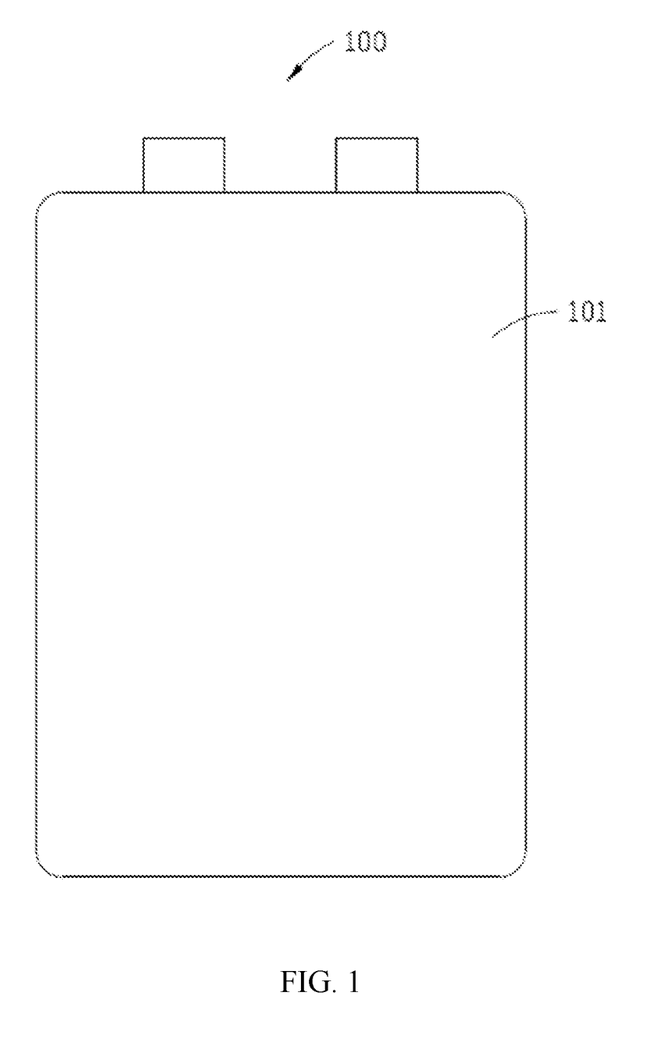
FIG. 1 is a schematic structural diagram of an electrochemical device according to an embodiment of this application.
Figure 2:
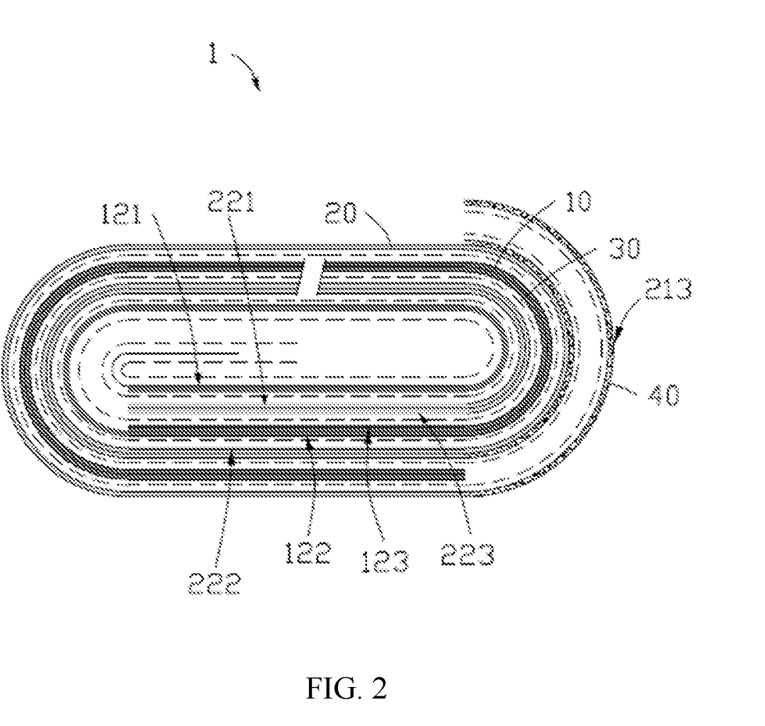
FIG. 2 is a schematic structural diagram of an electrode assembly of the electrochemical device shown in FIG. 1.

Referring to FIG. 1 and FIG. 2, an embodiment of this application provides an electrochemical device 100, including a housing 101 and an electrode assembly 1 accommodated in the housing 101. The electrode assembly 1 includes a negative electrode plate 10, a positive electrode plate 20, and a separator 30. The negative electrode plate 10, the positive electrode plate 20, and the separator 30 are stacked and wound. The separator 30 is configured to prevent the negative electrode plate 10 from directly contacting the positive electrode plate 20 and prevent a short circuit of the electrode assembly 1.

Figure 3:
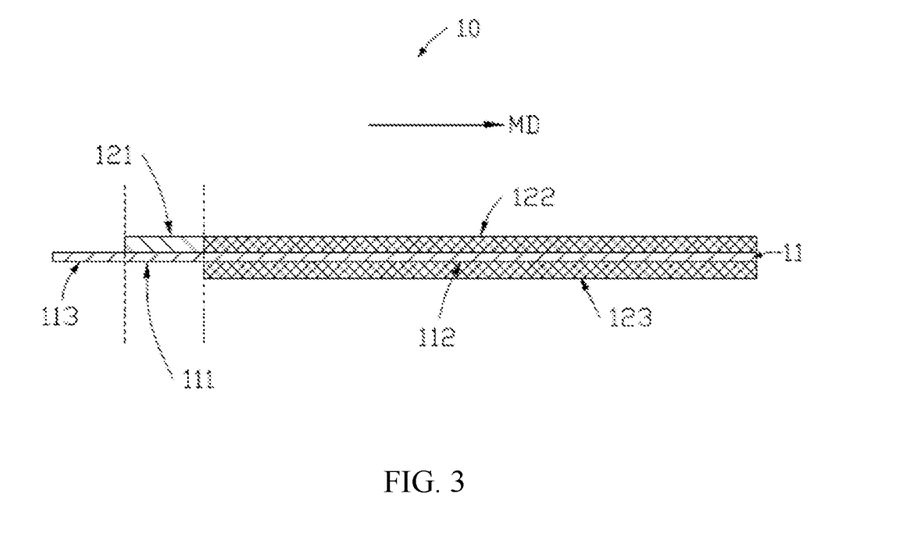
FIG. 3 is a schematic structural diagram of an expanded negative electrode plate of the electrode assembly shown in FIG. 2.

Referring to FIG. 3, the negative electrode plate 10 includes a negative current collector 11. The negative current collector 11 includes a first part 111 and a second part 112. The first part 111 and the second part 112 are sequentially connected in a winding direction. The first part 111 is a single-side-coated region. A first negative active material layer 121 is disposed on one side of the first part 111, and no negative active material layer is disposed on the other side. The second part 112 is a double-side-coated region. A second negative active material layer 122 and a third negative active material layer 123 are disposed on two sides of the second part 112 respectively. The first negative active material layer 121 and the second negative active material layer 122 are located on an identical side of the negative current collector 11. Because the first part 111 and the second part 112 are sequentially connected in the winding direction, the first negative active material layer 121 is closer to a winding start section of the negative electrode plate 10.

Figure 4:
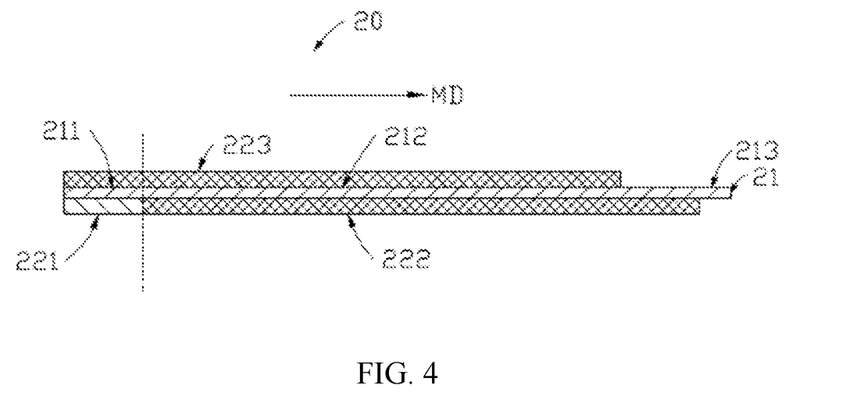
FIG. 4 is a schematic structural diagram of an expanded positive electrode plate of the electrode assembly shown in FIG. 2.

Referring to FIG. 4, the positive electrode plate 20 includes a positive current collector 21. The positive current collector 21 includes a third part 211 and a fourth part 212. A first positive active material layer 221 is disposed on the third part 211. A second positive active material layer 222 is disposed on the fourth part 212. The first positive active material layer 221 and the second positive active material layer 222 are located on an identical side of the positive current collector 21. The first positive active material layer 221 faces the first negative active material layer 121. The second positive active material layer 222 faces the second negative active material layer 122.

A ratio of a capacity per unit area of the first negative active material layer 121 to a capacity per unit area of the first positive active material layer 221 is $CB_1$, a ratio of a capacity per unit area of the second negative active material layer 122 to a capacity per unit area of the second positive active material layer 222 is $CB_2$, and $CB_1$ is greater than $CB_2$.

Generally, a process of preparing an electrode plate includes steps of stirring positive and negative slurries, electrode plate coating, electrode plate calendering, and electrode plate slitting. The calendering aims to achieve firmer compaction of the active material or a firmer bond between the active material and the current collector, and make the active material more homogeneous in thickness, so as to increase a compacted density of the electrode plate. It is found in this application that, if a single-sided active material layer (for example, the first negative active material layer 121 described herein above) is disposed at a head position of the negative electrode plate, when the electrode plate moves quickly along a travel direction (an MD direction, as shown in FIG. 3) during the calendering, because the thickness of the single-sided active material layer is smaller than the thickness of a double-sided active material layer in a main body region, the single-sided active material layer is vulnerable to incomplete calendering. Consequently, the density of the single-sided active material layer is usually lower than the density of the main body region. That is, the single-sided active material layer is more porous. Therefore, the single-sided active material layer requires a larger amount of electrolytic solution accordingly. After a long period of charge and discharge cycles, due to rapid consumption of the electrolytic solution near the single-sided active material layer, local polarization increases, and therefore, lithium excess or even lithium plating tend to occur at the single-sided active material layer.

A ratio of a capacity per unit area of the negative electrode plate 10 to a capacity per unit area of the positive electrode plate 20 is defined as a cell balance (CB) value. Lithium plating on the second negative active material layer 122 can be avoided by setting the capacity per unit area of the second negative active material layer 122 to be greater than that of the second positive active material layer 222 (that is, $CB_2$ is slightly greater than 1). Generally, $CB_1$ and $CB_2$ are equal. In this application, on the basis of ensuring that the capacity per unit area of the first negative active material layer 121 is slightly higher than that of the first positive active material layer 221 (that is, $CB_1$ is greater than 1), $CB_1$ is set to be greater than $CB_2$ allowing for risks of lithium plating on the single-sided active material layer at the head position of the negative electrode plate in the prior art. That is, $CB_1$ is further increased, thereby reducing risks of lithium plating on the first negative active material layer 121. In other words, when an identical quantity of lithium ions are deintercalated from a unit area of the first positive active material layer 221 and from the second positive active material layer 222 separately, the active material in a unit area of the first negative active material layer 121 can intercalate such lithium ions in the same way as the second negative active material layer 122, thereby avoiding accumulation of excessive lithium ions. In this way, the risks of forming lithium dendrites on the surface of the first negative active material layer 121 are reduced, and safety is improved.

In this application, $CB_1$ may be specifically set to be greater than $CB_2$ by increasing the capacity per unit area (that is, a lithium intercalation capacity) of the first negative active material layer 121. Therefore, in an embodiment of this application, the capacity per unit area of the first negative active material layer 121 is set to be greater than the capacity per unit area of the second negative active material layer 122. Therefore, a unit area of the first negative active material layer 121 is more capable of intercalating lithium than a unit area of the second negative active material layer 122. Therefore, when an identical quantity of lithium ions are deintercalated from a unit area of the first positive active material layer 221 and from a unit area of the second positive active material layer 222 separately, the active material per unit area of the first negative active material layer 121 is more capable of intercalating lithium ions than that of the second negative active material layer 122. In this way, the first negative active material layer 121 can intercalate such lithium ions, thereby reducing risks of lithium plating on the first negative active material layer 121.

Specifically, the first negative active material layer 121 includes a first negative active material. The second negative active material layer 122 includes a second negative active material. A specific capacity of the first negative active material is greater than a specific capacity of the second negative active material. In this way, the capacity per unit area of the first negative active material layer 121 can be made to be greater than the capacity per unit area of the second negative active material layer 122.

The negative active material is exemplified below by using an electrode assembly 1 applicable to a lithium-ion secondary battery as an example. The negative active material includes a negative electrode material capable of intercalating and deintercalating lithium, for example, a carbon material, a metal compound, an oxide, a sulfide, a lithium nitride (such as $LiN_3$), lithium metal, metal combined with lithium to form an alloy, and a polymer material.

The carbon material may include, but is not limited to: low-graphitization carbon, graphitization-prone carbon, artificial graphite, natural graphite, mesocarbon microbead, soft carbon, hard carbon, pyrolysis carbon, coke, glassy carbon, an organic polymer compound sintered body, carbon fiber, and activated carbon. The coke may include pitch coke, needle coke, and petroleum coke. The organic polymer compound sintered body means a material obtained by calcining a polymer material (for example, phenol plastic or furan resin) at an appropriate temperature until carbonization. The obtained material is classed into low-graphitization carbon and graphitization-prone carbon. The polymer material may include, but is not limited to, polyacetylene and polypyrrole.

Further, a material with a charge and discharge voltage close to that of lithium metal may be selected as the negative active material. That is because, the lower the charge and discharge voltage of the negative active material, the higher the energy density that the lithium-ion battery can easily achieve. A carbon material may be selected as the negative active material. Because a crystal structure of the carbon material is relatively small during charging and discharging, excellent cycle characteristics and a relatively high charge and discharge capacity can be achieved. Graphite may be particularly selected as the negative active material because graphite can provide a relatively large electrochemical equivalent and a relatively high energy density.

In addition, negative electrode materials capable of intercalating or deintercalating lithium may include simple-substance lithium metal, a metal element or semi-metal element capable of combining with lithium to form an alloy, an alloy or compound containing such element, and the like. Especially, the negative electrode materials are used together with a carbon material to achieve excellent cycle characteristics and a high energy density. The alloy used herein may be an alloy that contains two or more metal elements, or may be an alloy that contains one or more metal elements and one or more semi-metal elements. The alloy may be in one of the following states: solid solution, eutectic crystal (eutectic mixture), intermetallic compound, and a mixture thereof. Examples of metal elements and semi-metal elements may include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y), and hafnium (Hf). Examples of the alloy and compound may include materials of a chemical formula $Ma_sMb_tLi_u$ and materials of a chemical formula $Ma_pMc_qMd_r$. In such chemical formulas, Ma represents at least one element among the metal elements and semi-metal elements that can combine with lithium to form an alloy; Mb represents at least one element among the metal elements and semi-metal elements other than lithium and Ma; Mc represents at least one element among non-metal elements; Md represents at least one element among the metal elements and semi-metal elements other than Ma; and s, t, u, p, q, and r satisfy s>0, t≥0, u≥0, p>0, q>0, and r≥0.

In addition, an inorganic compound containing no lithium, such as $MnO_2$, $V_2O_5$, $V_6O_{13}$, NiS, and MoS, may be used in the negative electrode.

Table 1 enumerates the types of the negative active materials used in a lithium-ion battery and corresponding specific capacity. The first negative active material and the second negative active material may be selected based on the specific capacity of the negative active materials, and then coated onto the first part 111 and the second part 112 respectively. Understandably, Table 1 merely enumerates some of the negative active materials as examples, and the implementation of this application is not limited to the enumerated negative active materials. In addition, the specific capacity set out in Table 1 is the specific capacity actually achievable by the negative active material. Modification of the negative active material will change the specific capacity value.

TABLE 1

Examples of negative active materials and the specific capacity thereof

| Negative active material | Abbreviation | Specific capacity (mAh/g) | Average voltage (vs Li/Li$^+$) |
|---|---|---|---|
| Graphite | Gr | 370 | 0.1 |
| Graphene nanosheets | GNS | 740 | 0.1 |
| Soft carbon-250 | SC-250 | 250 | 0.5 |
| Soft carbon-400 | SC-400 | 400 | 0.5 |
| Hard carbon | HC | 450 | 0.5 |
| $SiO_x$-420 ($0 \leq x \leq 2$) | $SiO_x$-420 | 420 | 0.2 |
| $SiO_x$-1000 ($0 \leq x \leq 2$) | $SiO_x$-1000 | 1000 | 0.4 |
| Si-C-450 | SiC-450 | 450 | 0.2 |
| Si-C-1000 | SiC-1000 | 1000 | 0.4 |
| Si-C-2000 | SiC-2000 | 2000 | 0.4 |
| $Li_4Ti_5O_{12}$ | LTO | 160 | 1.56 |
| Li metal | Li | 3860 | 0 |
| Sn | Sn | 980 | 0.4 |
| Ge | Ge | 960 | 0.4 |
| $SnO_2$ | $SnO_2$ | 780 | 0.4 |
| $TiO_2$ | $TiO_2$ | 360 | 1.5 |
| $Fe_2O_3$ | $Fe_2O_3$ | 1000 | 0.7 |
| $MoS_2$ | $MoS_2$ | 910 | 0.7 |

In another embodiment, the first negative active material layer 121 further includes a second negative active material. That is, the first negative active material layer 121 includes both a first negative active material and a second negative active material. The second negative active material layer 122 includes a second negative active material. Because the specific capacity of the first negative active material is greater than that of the second negative active material, the capacity per unit area of the first negative active material layer 121 can also be made to be greater than the capacity per unit area of the second negative active material layer 122. Moreover, two different negative active materials are introduced into the first negative active material layer 121, so that the first negative active material layer 121 can integrate advantages of the two negative active materials. For example, the first negative active material contained in the first negative active material layer 121 is Si—C-2000. Considering that the volume of Si—C-2000 expands greatly during cycles although Si—C-2000 has a relatively high specific capacity, graphite may be further added into the first negative active material layer 121 to serve as a second negative active material. Although the specific capacity of graphite is low, the volume of graphite expands little during cycles. Therefore, the advantages of the two active materials may be integrated. The first negative active material layer 121 achieves a relatively small expansion of volume during cycles on the basis of ensuring a relatively high specific capacity.

Specifically, in preparing the negative electrode plate 10, the negative current collector 11 may be coated in different regions along a travel direction of the negative electrode plate 10. That is, the first part 111 and the second part 112 are coated with different negative active materials. The coating in different regions may be specifically implemented by, but without limitation, transfer coating or extrusion coating. The coating process may be: the negative current collector 11 is coated with a slurry twice in different regions by one coating head, and then the slurry is dried; or, the negative current collector 11 is coated with different slurries by two coating heads successively, and then the slurries are dried at a time. To improve production efficiency, the second process may be applied.

As shown in FIG. 3, in some embodiments, the negative current collector 11 farther includes a sixth part 113. The sixth part 113 is not coated with a negative active material layer. That is, the sixth part 113 is an empty foil region. The first part 111 is located between the second part 112 and the sixth part 113. In preparing the electrode assembly 1, the winding may be performed by using the sixth part 113 as a winding start section.

In this application, $CB_1$ may be specifically set to be greater than $CB_2$ by decreasing the capacity per unit area (that is, a lithium deintercalation capacity) of the first positive active material layer 221. Therefore, in another embodiment of this application, the capacity per unit area of the first positive active material layer 221 is set to be less than the capacity per unit area of the second positive active material layer 222. Therefore, fewer lithium ions can be deintercalated from a unit area of the first positive active material layer 221 than from a unit area of the second positive active material layer 222, and just such fewer lithium ions need to be intercalated into a unit area of the first negative active material layer 121, thereby also reducing risks of lithium plating on the first negative active material layer 121.

In an embodiment, the first positive active material layer 221 includes a first positive active material. The second positive active material layer 222 includes a second positive active material. A specific capacity of the first positive active material is less than a specific capacity of the second positive active material. In this way, the capacity per unit area of the first positive active material layer 221 can be made to be less than the capacity per unit area of the second positive active material layer 222.

The positive active material is exemplified below by using an electrode assembly 1 applicable to a lithium-ion secondary battery as an example. The positive active material includes a positive electrode material into which lithium (Li) can be intercalated and from which Li can be deintercalated, for example, lithium cobaltate, a ternary material, lithium manganate, lithium iron manganese phosphate, lithium vanadium phosphate, lithium vanadyl phosphate, lithium iron phosphate, lithium titanate, and a lithium- and manganese-containing current collector material.

In the foregoing positive active materials, the chemical formula of the lithium cobaltate may be, but is not limited to, $Li_1Co_aM1_bO_{2-c}H_d$, where M1 is selected from groups containing nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), silicon (Si), and any combination thereof; H is selected from groups containing fluorine (F), sulfur (S), boron (B), nitrogen (N), phosphorus (P), or any combination thereof; and the values of γ, a, b, c, and d fall within the following ranges: $0.8 \leq \gamma \leq 1.2$, $0.8 \leq a \leq 1$, $0 \leq b \leq 0.2$, $-0.1 \leq c \leq 0.2$, and $0 \leq d \leq 0.2$.

In the positive active material, the chemical formula of the ternary material may be $Li_\alpha Ni_x Co_y M2_z N1_\beta O_2$, where $0.7 \leq \alpha \leq 1.3$, $0.3 \leq x < 1$, $0 < y < 0.4$, $0 < z < 0.4$, $0 \leq \beta \leq 0.05$, and $x+y+z+\beta=1$; M2 is at least one selected from Mn or Al; and N1 is at least one selected from Mg, B, Ti, Fe, Cu, Zu, Su, Ca, W, Si, Zr, Nb, Y, Cr, V, Ge, Mo, or Sr.

In some embodiments of this application, the ternary material includes lithium nickel cobalt manganese oxide and/or lithium nickel cobalt aluminum oxide.

In the foregoing positive active material, the chemical formula of the lithium manganate may be $Li_k Mn_{2-p} M3_p O_{4-e}$, where M3 is selected from groups containing cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), or any combination thereof; and the values of k, p, and r fall within the following ranges: $0.8 \leq k \leq 1.2$, $0 \leq p < 1.0$, and $-0.2 \leq e \leq 0.2$.

Table 2 enumerates the types of the positive active materials of lithium-ion batteries, and the specific capacity thereof. The first positive active material and the second positive active material may be selected based on the specific capacity of the positive active materials, and then coated onto the third part 211 and the fourth part 212 respectively. Understandably, Table 2 merely enumerates some of the positive active materials as examples, and the implementation of this application is not limited to the enumerated positive active materials. In addition, the specific capacity set out in Table 2 is the specific capacity actually achievable by the positive active material. Modification of the positive active material will change the specific capacity value.

TABLE 2

Examples of positive active materials and the specific capacity thereof

| Positive active material | Abbreviation | Specific capacity (mAh/g) | Average voltage (vs Li/Li$^+$) |
|---|---|---|---|
| $LiCoO_2$-140 | LCO-140 | 140 | 3.8 |
| $LiCoO_2$-180 | LCO-180 | 180 | 4.3 |
| $LiCoO_2$-220 | LCO-220 | 220 | 4.3 |
| $LiMn_2O_4$ | LMO | 130 | 4.05 |
| $LiFePO_4$ | LFP | 160 | 3.4 |
| $LiCoPO_4$ | LCP | 130 | 4.8 |
| $LiNiO_2$ | LNO | 200 | 3.7 |
| $LiNi_{0.33}Mn_{0.33}Co_{0.33}O_2$ | NCM333 | 160 | 3.7 |
| $LiNi_{0.5}Mn_{0.2}Co_{0.3}O_2$ | NCM523 | 180 | 3.7 |
| $LiNi_{0.6}Mn_{0.2}Co_{0.2}O_2$ | NCM622 | 200 | 3.7 |
| $LiNi_{0.8}Mn_{0.1}Co_{0.1}O_2$ | NCM811 | 220 | 3.7 |
| $xLi_2MnO_3(1-x)LiMO_2$ (M = Ni, Co, Mn)-250 | Li-rich-250 | 250 | 3.75 |
| $xLi_2MnO_3(1-x)LiMO_2$ (M = Ni, Co, Mn)-280 | Li-rich-280 | 280 | 3.75 |
| $xLi_2MnO_3(1-x)LiMO_2$ (M = Ni, Co, Mn)-300 | Li-rich-300 | 300 | 3.75 |
| $LiNi_{0.8}Co_{0.15}Al_{0.05}O_2$-180 | NCA-180 | 180 | 3.7 |
| $LiNi_{0.8}Co_{0.15}Al_{0.05}O_2$-200 | NCA-200 | 200 | 3.7 |
| $LiNi_{0.8}Co_{0.15}Al_{0.05}O_2$-220 | NCA-220 | 220 | 3.7 |
| $LiNi_{0.5}Mn_{1.5}O_4$ | LNM | 135 | 4.7 |
| $Li_3V_2(PO_4)_3$ | LVP | 180 | 3.8 |

In another embodiment, the first positive active material layer 221 further includes a second positive active material. That is, the first positive active material layer 221 includes both the first positive active material and the second positive active material. The second positive active material layer 222 includes the second positive active material. This can also achieve the effect that the capacity per unit area of the first positive active material layer 221 is less than the capacity per unit area of the second positive active material layer 222, and can also achieve the effect that the capacity per unit area of the first positive active material layer 221 is less than the capacity per unit area of the second positive active material layer 222. Moreover, two different positive active materials are introduced into the first positive active material layer 221, so that the first positive active material layer 221 can integrate advantages of the two positive active materials.

Specifically, in preparing the positive electrode plate 20, the positive current collector 21 may be coated in different regions along a travel direction of the positive electrode plate 20. That is, the third part 211 and the fourth part 212 are coated with different positive active materials. The coating in different regions may be specifically implemented by transfer coating or extrusion coating. The coating process may be: the positive current collector 21 is coated with a slurry twice in different regions by one coating head, and then the slurry is dried; or, the positive current collector 21 is coated with different slurries by two coating heads successively, and then the slurries are dried at a time.

In an embodiment, the negative current collector 11 may be, but is not limited to, a copper foil or a nickel foil. The positive current collector 21 may be, but is not limited to, an aluminum foil or a nickel foil.

As shown in FIG. 2 and FIG. 4, in an embodiment, the third part 211 is a double-side-coated region. Along the winding direction, the head of the fourth part 212 is a double-side-coated region, and the tail of the fourth part 212 is a single-side-coated region. Because the head of the fourth part 212 and the third part 211 are double-side-coated regions, a third positive active material layer 223 is further disposed on the head of the fourth part 212 and on the third part 211. The third part 211 is located between the first positive active material layer 221 and the third positive active material layer 223. The fourth part 212 is located between the second positive active material layer 222 and the third positive active material layer 223.

The third negative active material layer 123 faces the third positive active material layer 223. The third negative active material layer 123 may use the same negative active material as the second negative active material layer 122. The third positive active material layer 223 may use the same positive active material as the second positive active material layer 222. Because the capacity per unit area of the second negative active material layer 122 is greater than that of the third positive active material layer 222 (that is, CB$_2$ is greater than 1), the capacity per unit area of the third negative active material layer 123 is also greater than that of the third positive active material layer 223, thereby avoiding lithium plating on the third positive active material layer 123.

Alternatively, in another embodiment, the third negative active material layer 123 may use a negative active material different from that of the second negative active material layer 122, and the third positive active material layer 223 may use a positive active material different from that of the second positive active material layer 222 as long as the capacity per unit area of the third negative active material layer 123 is greater than that of the third positive active material layer 223.

The positive current collector 21 further includes a fifth part 213. The fourth part 212 is located between the third part 211 and the fifth part 213. The fifth part 213 is an empty foil region. That is, the fifth part 213 is not coated with a positive active material layer. The fifth part 213 may be located at an outermost circle of the electrode assembly 1. The fifth part 213 is set to be a finishing section of the electrode assembly 1. In this way, on the one hand, the positive current collector 21 can increase rigidity of the electrode assembly 1, serve to protect the electrode assembly 1, and avoid failure or risks caused by mechanical abuse of the electrode assembly 1. On the other hand, this prevents the negative current collector 11 (such as a copper foil) from being vulnerable to corrosion by an electrolytic solution when the negative electrode plate 10 is finished. A finishing adhesive 40 may be applied at a finishing section of the electrode assembly 1 (that is, the fifth part 213).

Alternatively, in another embodiment, the tail of the fourth part 212 and the second positive active material layer 222 disposed at the tail of the fourth part 212 may be omitted, and the fifth part 213 may also be omitted.

The material and the shape of the separator 30 used in a battery cell according to this application are not particularly limited, and may be based on any technology disclosed in the prior art. In some embodiments, the separator 30 includes a polymer or an inorganic compound or the like formed from a material that remains steady to the electrolytic solution according to this application.

The electrochemical device 100 further includes an electrolytic solution (not shown in the drawing). The status of the electrolytic solution may be one or more of a gel state, a solid state, and a liquid state. The liquid-state electrolytic solution includes a lithium salt and a nonaqueous solvent.

The lithium salt is one or more selected from $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, LiBOB, and $LiPO_2F_2$. For example, the lithium salt is $LiPF_6$ because it provides a high ionic conductivity and improves cycle characteristics.

The nonaqueous solvent may be a carbonate compound, a carboxylate compound, an ether compound, a nitrile compound, another organic solvent, or any combination thereof. Examples of the carbonate compound are diethyl carbonate (DEC), dimethyl carbonate (DMC), dipropyl carbonate (DPC), methyl propyl carbonate (MPC), ethylene propyl carbonate (EPC), ethyl methyl carbonate (EMC), ethylene carbonate (EC), propylene carbonate (PC), butylene carbonate (BC), vinyl ethylene carbonate (VEC), fluoroethylene carbonate (FEC), 1, 2-difluoroethylene carbonate, 1,1-difluoroethylene carbonate, 1,1,2-trifluoroethylene carbonate, 1,1,2,2-tetrafluoroethylene carbonate, 1-fluoro-2-methyl ethylene, 1-fluoro-1-methyl ethylene carbonate. 1,2-difluoro-1-methyl ethylene carbonate, 1,1,2-trifluoro-2-methyl ethylene carbonate, trifluoromethyl ethylene carbonate, and any combinations thereof.

Although the foregoing description uses a lithium-ion battery as an example, this application is applicable to other appropriate electrochemical devices, including any device in which an electrochemical reaction can occur, such as all kinds of primary batteries, secondary batteries, fuel batteries, solar batteries, or capacitors. In particular, the electrochemical device 100 may be a lithium secondary battery, including a lithium metal secondary battery, a lithium-ion secondary battery, a lithium polymer secondary battery, and a lithium-ion polymer secondary battery.

Figure 5:
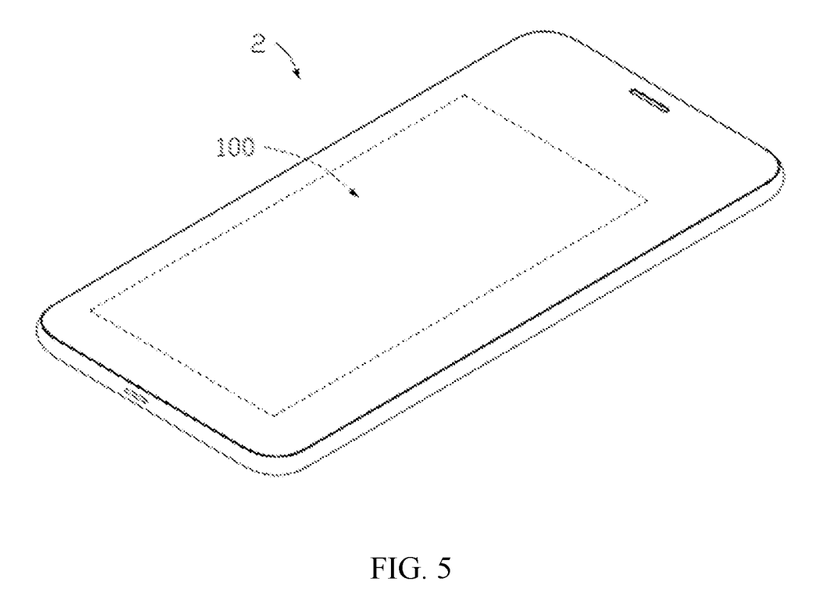
FIG. 5 is a schematic structural diagram of an electronic device according to an embodiment of this application.

Referring to FIG. 5, this application further provides an electronic device 2 containing the electrochemical device 100. The electrochemical device 100 according to this application is applicable to electronic devices 2 for use in various fields. In an embodiment, the electrochemical device 100 according to this application is applicable to, but without limitation: a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

The following describes this application in more detail with reference to specific embodiments and comparative embodiments. This application is described below with reference to a specific preparation process and a test method using a lithium-ion secondary battery as an example. A person skilled in the art understands that the preparation method described in this application is merely an example. Any other appropriate preparation methods fall within the scope of this application.

(i) Embodiments 1~4 and Comparative Embodiments 1~4

Embodiments 1~4 deal with just coating of the positive electrode plate in different regions, but not coating of the negative electrode plate in different regions. By coating in different regions, Embodiments 1~4 satisfy that the specific capacity of the active material of the first positive active material layer is less than the specific capacity of the active material of the second positive active material layer.

Embodiment 1

(1) Preparing a Slurry

Positive NCM811 or NCM523 slurry: mixing a positive active ingredient NCM811 (with a specific capacity of 220 mAh/g) or NCM523 (with a specific capacity of 180 mAh/g), a Super-P conductive agent, and polyvinylidene difluoride (PVDF) as a binder at a weight ratio of 97%:1.5%:1.5%, and diluting the mixture by using an appropriate amount of N-methyl-pyrrolidone, and then stirring in a vacuum mixer to form a homogeneous positive slurry.

Negative graphite slurry: mixing graphite as a negative active ingredient, styrene butadiene rubber (SBR) as a binder, and carboxymethyl cellulose (CMC) as a dispersant at a weight ratio of 97%:1%:2%, and diluting the mixture by using an appropriate amount of distilled water, and then stirring in a vacuum mixer to form a homogeneous negative shiny.

(2) Coating the Positive Electrode in Different Regions

Coating the positive electrode in different regions: performing coating in different regions according to the following steps:

A. Coating the NCM523 slurry prepared in step (1) onto a single side of a third part of an aluminum foil by using a coating head (to form a first positive active material layer), and coating the NCM811 slurry prepared in step (1) onto a single side of a fourth part of the aluminum foil by using another coating head (to form a second positive active material layer). Placing the single-side-coated electrode plate into an 85° C. high-temperature oven for drying;

B. Applying the NCM811 slurry prepared in step (1) onto a second side of the single-side-coated electrode plate (to form a third positive active material layer). Placing the double-side-coated electrode plate into the 85° C. high-temperature oven for drying to obtain a positive electrode plate.

(3) Coating the Negative Electrode

C. Coating the negative slurry prepared in step (1) onto a single side of a copper foil current collector, and placing the single-side-coated electrode plate into an 85° C. high-temperature oven for drying.

D. Performing coating on a second side of the single-side-coated electrode plate, where the coating method, coated regions, and materials are the same as those applied in step C. Placing the double-side-coated electrode plate into the 85° C. high-temperature oven for drying to obtain a negative electrode plate according to Embodiment 1.

(4) Preparing an Electrolytic Solution

Mixing a lithium salt $LiPF_6$ and a nonaqueous organic solvent (a mass ratio of ethylene carbonate (EC):diethyl carbonate (DEC):propylene carbonate (PC):propyl propionate (PP):vinylene carbonate (VC) is equal to 20:30:20:28:2) at a mass ratio of 8:92 to prepare a solution serving as an electrolytic solution.

(5) Preparing a Separator

The separator is made of a ceramic-coated polyethylene (PE) material.

(6) Preparing a Battery

Stacking the positive electrode plate, the separator, and the negative electrode plate sequentially, and winding them to obtain an electrode assembly. Placing the electrode assembly into a packaging shell, injecting the electrolytic solution into the packaging shell, and performing chemical formation to finally make a lithium-ion battery.

Embodiment 2

Embodiment 2 differs from Embodiment 1 merely in that the active material of the first positive active material layer is replaced with LCO-180 (with a specific capacity of 180 mAh/g).

Embodiment 3

Embodiment 3 differs from Embodiment 1 merely in that the active material of the first positive active material layer is replaced with LFP (with a specific capacity of 160 mAh/g) and that the active material of the second positive active material layer is replaced with LCO-180 (with a specific capacity of 180 mAh/g).

Embodiment 4

Embodiment 4 differs from Embodiment 1 merely in that the active material of the first positive active material layer is replaced with a mixture of 50 wt % NCM811 and 50 wt % NCM523.

Comparative Embodiments 1~4

Comparative Embodiments 1~4 correspond to Embodiments 1~4 respectively (in the corresponding embodiments and comparative embodiments, thicknesses of electrode plates are similar before cycling). Comparative Embodiments 1~4 differ from Embodiments 1~4 merely in that: instead of coating the positive electrode plate in different regions, the corresponding positive slurry is coated onto the aluminum foil according to a conventional process. For differences between the comparative embodiments and the corresponding embodiments, refer to Table 1.

This application uses the difference between the thickness of the negative electrode plate prior to cycling and the thickness subsequent to cycling to measure the degree of lithium plating of the lithium-ion battery, so as to reflect the safety of the lithium-ion battery. Specifically, the first part and the first negative active material layer are defined as a first region of the negative electrode; and the second part, the second negative active material layer, and the third negative active material layer are defined as a second region of the negative electrode. If lithium plating occurs on the negative active material layer after the lithium-ion battery has been cycled repeatedly, the thicknesses of the first region and the second region of the negative electrode will increase. Therefore, this application uses the difference between the thickness of the first region and the second region of the negative electrode prior to the cycling and the thickness subsequent to the cycling to measure the degree of lithium plating of the lithium-ion battery.

The lithium-ion battery is left to stand for 30 minutes at a normal temperature, and is charged at a constant current of a 1.5 C rate until the voltage reaches 4.40 V, and then charged at a constant voltage of 4.40 V until the current reaches 0.05 C. Then the lithium-ion battery is left to stand for 5 minutes, and then discharged at a constant current of a 4 C rate until the voltage reaches 2.8 V. This is a charge and discharge cycle. Subsequently, the lithium-ion battery undergoes 1000 charge and discharge cycles, and then the thickness of the negative electrode plate is measured after the cycling. The thickness of the negative electrode plate is measured by using a high-precision digital micrometer of a 0.1 μm precision (manufactured by Mitutoyo). Specifically, the measurement steps include: disassembling an assembled electrode assembly, taking out the negative electrode plate, and washing away surface residue with diethyl carbonate (DEC); wiping a micrometer test head with dust-free paper to remove foreign objects and ensure accuracy of the measurement; placing the negative electrode plate into the micrometer test head, rotating a handle of the micrometer to closely contact the negative electrode plate, and reading a thickness value. The thickness of the negative electrode plate is measured at ten different points selected on the negative electrode plate, and ten measured thickness values are obtained and averaged out.

Main preparation parameters and performance test results of the positive electrode plate of the battery in Embodiments 1~4 and Comparative Embodiments 1~4 are recorded in Table 3.

TABLE 3

| Example | Material of the second positive active material layer (mAh/g indicates specific capacity) | Material of the first positive active material layer (mAh/g indicates specific capacity) | Thickness of the second region of the negative electrode before cycling (μm) | Thickness of the second region of the negative electrode after 1000 cycles (μm) | Thickness of the first region of the negative electrode before cycling (μm) | Thickness of the first region of the negative electrode after 1000 cycles (μm) |
|---|---|---|---|---|---|---|
| Embodiment 1 | NCM811 (220 mAh/g) | NCM523 (180 mAh/g) | 105.8 | 134.2 | 51.2 | 64.6 |
| Embodiment 2 | NCM811 (220 mAh/g) | LCO (180 mAh/g) | 93.6 | 122.7 | 44.8 | 58.1 |
| Embodiment 3 | LCO-180 (180 mAh/g) | LFP (160 mAh/g) | 99.0 | 127.9 | 46.5 | 66.1 |
| Embodiment 4 | NCM811 (220 mAh/g) | 50%NCM811 + 50%NCM523 (200 mAh/g) | 102.5 | 132.0 | 49.0 | 69.1 |
| Comparative Embodiment 1 | NCM811 (220 mAh/g) | NCM811 (220 mAh/g) | 105.9 | 135.1 | 51.6 | 78.8 |
| Comparative Embodiment 2 | NCM811 (220 mAh/g) | NCM811 (220 tnAh/g) | 93.4 | 125.5 | 45.0 | 74.2 |
| Comparative Embodiment 3 | LCO-180 (180 mAh/g) | LCO-180 (180 mAh/g) | 97.2 | 126.8 | 46.0 | 77.3 |
| Comparative Embodiment 4 | NCM811 (220 mAh/g) | NCM811 (220 mAh/g) | 102.9 | 131.9 | 49.3 | 79.7 |

Referring to Table 3, the second positive active material layer in Embodiment 1 uses an NCM811 positive electrode material with a specific capacity of 220 mAh/g. When the capacity per unit area of the second positive active material layer is made to be 3.0 mAh/cm² by adjusting a coating weight, a ratio $CB_2$ of the capacity per unit area of the second negative active material layer to the capacity per unit area of the second positive active material layer is designed to be 1.05. Therefore, the capacity per unit area of the second negative active material layer is 3.15 mAh/cm². The first positive active material layer uses an NCM523 positive electrode material with a low specific capacity (with a specific capacity of 180 mAh/g) so that the quantity of lithium ions deintercalated from the first positive active material layer is reduced. Therefore, the capacity per unit area of the first positive active material layer is reduced to 2.45 mAh/cm². In this way, the ratio $CB_1$ of the capacity per unit area of the first negative active material layer to the capacity per unit area of the first positive active material layer is increased to 1.28, thereby reducing risks of lithium plating on the first negative active material layer. Specifically, in contrast with Comparative Embodiment 1, after the battery in Embodiment 1 has been cycled repeatedly, the change in the thickness of the first region and the thickness of the second region of the negative electrode is small, indicating that the lithium plating phenomenon is suppressed. Embodiments 2 and 3 are designed based on the same principles as Embodiment 1, and bring similar effects except that the specific parameters are different.

In contrast with Embodiments 1-3. Embodiment 4 is designed based on similar principles but differs in that another active material of a slightly lower specific capacity is added into the first positive active material layer that already uses the active material identical to the active material of the second positive active material layer, thereby reducing the capacity per unit area of the first positive active material layer. In contrast with Comparative Embodiment 4, Embodiment 4 can also reduce the risks of lithium plating on the first negative active material layer.

(ii) Embodiments 5~7 and Comparative Embodiments 5~6

Embodiments 5~7 and Comparative Embodiments 5~6 deal with just coating of the negative electrode plate in different regions, but not coating of the positive electrode plate in different regions. By coating in different regions, Embodiments 5~7 satisfy that the specific capacity of the active material of the first negative active material layer is greater than the specific capacity of the active material of the second negative active material layer.

Embodiment 5

(1) Preparing a Slurry

Negative graphite slurry or GNS slurry: mixing graphite (with a specific capacity of 370 mAh/g) or GNS (with a specific capacity of 740 mAh/g) as a negative active ingredient, styrene butadiene rubber (SBR) as a binder, and carboxymethyl cellulose (CMC) as a dispersant at a weight ratio of 97%:1%:2%, and diluting the mixture by using an appropriate amount of distilled water, and then stirring in a vacuum mixer to form a homogeneous negative slurry.

Positive NCM811 slurry: mixing a positive active ingredient NCM811 (with a specific capacity of 220 mAh/g), a Super-P conductive agent, and polyvinylidene difluoride (PVDF) as a binder at a weight ratio of 97%:1.5%:1.5%, and diluting the mixture by using an appropriate amount of N-methyl-pyrrolidone, and then stirring in a vacuum mixer to form a homogeneous positive slurry.

(2) Coating the Negative Electrode in Different Regions

Coating the negative electrode in different regions: performing coating in different regions according to the following steps:

A. Coating the GNS (with a specific capacity of 740 mAh/g) slurry prepared in step (1) onto a single side of a first part of a copper foil by using a coating head (to form a first negative active material layer), and coating the graphite (with a specific capacity of 370 mAh/g) slurry prepared in step (1) onto a single side of a second part of the copper foil by using another coating head (to form a second negative active material layer). Placing the single-side-coated electrode plate into an 85° C. high-temperature oven for drying;

B. Performing coating on a second side of the single-side-coated electrode plate, where the coating method, coated regions, and materials are the same as those applied in step A. Placing the double-side-coated electrode plate into the 85° C. high-temperature oven for drying to obtain a negative electrode plate.

(3) Coating the Positive Electrode

C. Coating the positive slurry prepared in step (1) onto a single side of an aluminum foil current collector, and placing the single-side-coated electrode plate into an 85° C. high-temperature oven for drying.

specific capacity of 370 mAh/g) slurry is coated onto a copper foil according to a conventional process.

Comparative Embodiment 6

Comparative Embodiment 6 differs from Embodiment 7 merely in that: instead of coating the negative electrode plate in different regions, merely a slurry of a mixture of 90 wt % graphite and 10 wt % HC is coated onto a copper foil according to a conventional process.

Main preparation parameters and performance test results of the negative electrode plate of the battery in Embodiments 5~7 and Comparative Embodiments 5~6 are recorded in Table 4.

TABLE 4

| Example | Material of the second negative active material layer (mAh/g indicates specific capacity) | Material of the first negative active material layer (mAh/g indicates specific capacity) | Thickness of the second region of the negative electrode before cycling (μm) | Thickness of the second region of the negative electrode after 1000 cycles (μm) | Thickness of the first region of the negative electrode before cycling (μm) | Thickness of the first region of the negative electrode after 1000 cycles (μm) |
|---|---|---|---|---|---|---|
| Embodiment 5 | Gr (370 mAh/g) | GNS (740 mAh/g) | 119.4 | 138.9 | 58.7 | 73.8 |
| Embodiment 6 | Gr (370 mAh/g) | Gr + 5% SiC-2000 (452 mAh/g) | 76.1 | 98.5 | 39.0 | 50.3 |
| Embodiment 7 | Gr + 10% HC (378 mAh/g) | Gr + 10% SiOx-1000 (433 mAh/g) | 79.3 | 103.4 | 41.1 | 52.4 |
| Comparative Embodiment 5 | Gr (370 mAh/g) | Gr (370 mAh/g) | 119.1 | 138.3 | 58.8 | 81.5 |
| Comparative Embodiment 6 | Gr + 10% HC (378 mAh/g) | Gr + 10% HC (378 mAh/g) | 77.6 | 98.2 | 38.0 | 64.0 |

D. Performing coating on a second side of the single-side-coated electrode plate, where the coating method, coated regions, and materials are the same as those applied in step C. Placing the double-side-coated electrode plate into the 85° C. high-temperature oven for drying to obtain a negative electrode plate.

The electrolytic solution, the separator, and the battery are subsequently prepared in the same way as those described in Embodiment 1, details of which are omitted herein.

Embodiment 6

Embodiment 6 differs from Embodiment 5 merely in that the active material of the first negative active material layer is replaced with a mixture of 95 wt % graphite and 5 wt % SiC-2000.

Embodiment 7

Embodiment 7 differs from Embodiment 5 merely in that the active material of the first negative active material layer is replaced with a mixture of 90 wt % graphite and 10 wt % $SiO_x$-1000 and that the active material of the second negative active material layer is replaced with a mixture of 90 wt % graphite and 10 wt % HC.

Comparative Embodiment 5

Comparative Embodiment 5 differs from Embodiments 5 and 6 merely in that: instead of coating the negative electrode plate in different regions, merely a graphite (with a Referring to Table 4, the second negative active material layer in Embodiment 5 uses a graphite negative material with a specific capacity of 370 mAh/g. When the capacity per unit area of the second negative active material layer is made to be 2.9 mAh/cm² by adjusting a coating weight, $CB_2$ is designed to be 1.08. Therefore, the capacity per unit area of the second positive active material layer is 2.69 mAh/cm². The first negative active material layer uses a GNS material with a relatively high specific capacity (with a specific capacity of 740 mAh/g) so that the first negative active material layer is more capable of intercalating lithium ions. Therefore, the capacity per unit area of the first negative active material layer is increased to 5.8 mAh/cm². In this way, the ratio $CB_1$ of the capacity per unit area of the first negative active material layer to the capacity per unit area of the first positive active material layer is increased to 2.16, thereby reducing risks of lithium plating on the first negative active material layer. Specifically, in contrast with Comparative Embodiment 5, after the battery in Embodiment 5 has been cycled repeatedly, the change in the thickness of the first region and the thickness of the second region of the negative electrode is small, indicating that the lithium plating phenomenon is suppressed.

In contrast with Embodiment 5, Embodiment 6 differs in that another active material of a higher specific capacity is added into the first negative active material layer that already uses the active material identical to the active material of the second negative active material layer, thereby increasing the specific capacity per unit area of the first negative active material layer. In contrast with Embodiment 5, Embodiment 7 differs in that a second active material of a different specific capacity is added into both the first negative active material layer and the second negative active material layer to increase the specific capacity per unit area of the first negative active material layer. In contrast with Comparative Embodiments 5 and 6, Embodiments 6 and 7 can also reduce the risks of lithium plating on the first negative active material layer.

(iii) Embodiments 8~10 and Comparative Embodiments 7~8

Embodiments 8~10 deal with both coating of the negative electrode plate and coating of the positive electrode plate in different regions. By coating in different regions, Embodiments 8~10 satisfy that the specific capacity of the active material of the first positive active material layer is less than the specific capacity of the active material of the second positive active material layer, and that the specific capacity of the active material of the first negative active material layer is greater than the specific capacity of the active material of the second negative active material layer.

Main preparation parameters and performance test results of the electrode plates of the battery in Embodiments 8~10 and Comparative Embodiments 7~8 are recorded in Table 5.

negative active material layer. Specifically, in contrast with Comparative Embodiment 7, after the battery in Embodiment 8 has been cycled repeatedly, the change in the thickness of the first region and the thickness of the second region of the negative electrode is small, indicating that the lithium plating phenomenon is suppressed. Embodiment 9 is designed based on the same principles as Embodiment 8, and brings similar effects except that the specific parameters are different.

Embodiment 10 is designed based on the same principles as Embodiments 8 and 9, but differs in that the first negative active material layer uses an active material of a mixture of Gr and 20 wt % HC, and that the specific capacity of the active material is 386 mAh/g which is higher than that of the active material of the second negative active material layer. Therefore, in contrast with Comparative Embodiment 8, the lithium plating phenomenon of the negative electrode plate in Embodiment 10 can be suppressed.

In contrast with Embodiments 1~3. Embodiment 4 is designed based on similar principles but differs in that another active material of a slightly lower specific capacity is added into the first positive active material layer that already uses the active material identical to the active

TABLE 5

| | Material of the second positive/ negative active material layer | Material of the first positive/ negative active material layer | Thickness of the second region of the negative electrode before cycling (μm) | Thickness of the second region of the negative electrode after 1000 cycles (μm) | Thickness of the first region of the negative electrode before cycling (μm) | Thickness of the first region of the negative electrode after 1000 cycles (μm) |
|---|---|---|---|---|---|---|
| Embodiment 8 | NCM811/Gr | NCM523/Si-C | 81.6 | 103.7 | 40.1 | 50.6 |
| Embodiment 9 | NCM811/Gr | LMO/HC | 91.7 | 106.5 | 43.3 | 54.2 |
| Embodiment 10 | LCO-180/Gr | LFP/Gr + 20 wt % HC | 92.7 | 110.0 | 44.6 | 57.1 |
| Comparative Embodiment 7 | NCM811/Gr | NCM811/Gr | 92.0 | 105.6 | 44.0 | 64.6 |
| Comparative Embodiment 8 | LCO-180/Gr | LCO-180/Gr | 92.8 | 108.9 | 43.9 | 66.3 |

Referring to Table 5, the second positive active material layer in Embodiment 8 uses an NCM811 positive electrode material with a specific capacity of 220 mAh/g, and the second negative active material layer uses a graphite material with a specific capacity of 370 mAh/g. In addition, the first positive active material layer uses the NCM523 positive electrode material with a specific capacity of 180 mAh/g, and the first negative active material layer uses the Si—C negative electrode material with a specific capacity of 450 mAh/g. $CB_2$ is designed to be 1.06. Therefore, when the capacity per unit area of the second negative active material layer is set to be 2.92 mAh/cm², the capacity per unit area of the second positive active material layer is 2.7 mAh/cm². When it is ensured that the coating weight in the first region is identical to that in the second region, the capacity per unit area of the first negative active material layer and the capacity per unit area of the first positive active material layer are calculated as 3.55 mAh/cm² and 2.21 mAh/cm² respectively. That is, the $CB_1$ is 1.61, which is a ratio of the capacity per unit area of the first negative active material layer to the capacity per unit area of the first positive active material layer. In other words, the capability of lithium intercalation of the first negative active material layer is enhanced to reduce the risks of lithium plating on the first material of the second positive active material layer, thereby reducing the capacity per unit area of the first positive active material layer. In contrast with Comparative Embodiment 4, Embodiment 4 can also reduce the risks of lithium plating on the first negative active material layer.

The foregoing embodiments are merely intended for describing the technical solutions of this application but not intended as a limitation. Although this application is described in detail with reference to the foregoing optional embodiments, a person of ordinary skill in the art understands that modifications or equivalent substitutions may be made to the technical solutions of this application without departing from the conception of the technical solutions of this application.

What is claimed is:

1. An electrochemical device, comprising: an electrode assembly, wherein the electrode assembly comprises a negative electrode plate, a positive electrode plate, and a separator; and the negative electrode plate, the separator, and the positive electrode plate are stacked and wound;

the negative electrode plate comprises a negative current collector, the negative current collector comprises a first part and a second part, and the first part and the second part are sequentially connected in a winding direction;

a first negative active material layer is disposed on one side of the first part, and no negative active material layer is disposed on the other side;

a second negative active material layer and a third negative active material layer are disposed on two sides of the second part respectively, and the first negative active material layer and the second negative active material layer are located on a same side of the negative current collector;

the positive electrode plate comprises a positive current collector, the positive current collector comprises a third part and a fourth part, a first positive active material layer is disposed on the third part, a second positive active material layer is disposed on the fourth part, the first positive active material layer faces the first negative active material layer, and the second positive active material layer faces the second negative active material layer;

a ratio of a capacity per unit area of the first negative active material layer to a capacity per unit area of the first positive active material layer is $CB_1$, a ratio of a capacity per unit area of the second negative active material layer to a capacity per unit area of the second positive active material layer is $CB_2$, and $CB_1$ is greater than $CB_2$.

2. The electrochemical device according to claim 1, wherein the capacity per unit area of the first negative active material layer is greater than the capacity per unit area of the second negative active material layer.

3. The electrochemical device according to claim 2, wherein the first negative active material layer comprises a first negative active material, the second negative active material layer comprises a second negative active material, and a specific capacity of the first negative active material is greater than a specific capacity of the second negative active material.

4. The electrochemical device according to claim 3, wherein the first negative active material layer further comprises the second negative active material.

5. The electrochemical device according to claim 1, wherein the capacity per unit area of the first positive active material layer is less than the capacity per unit area of the second positive active material layer.

6. The electrochemical device according to claim 5, wherein the first positive active material layer comprises a first positive active material, the second positive active material layer comprises a second positive active material, and a specific capacity of the first positive active material is less than a specific capacity of the second positive active material.

7. The electrochemical device according to claim 6, wherein the first positive active material layer further comprises the second positive active material.

8. The electrochemical device according to claim 1, wherein the positive current collector further comprises a fifth part, the fourth part is located between the third part and the fifth part, no positive active material layer is disposed on the fifth part, and the fifth part is located on an outermost circle of the electrode assembly.

9. The electrochemical device according to claim 1, wherein the negative current collector further comprises a sixth part, no negative active material layer is disposed on the sixth part, and the first part is located between the sixth part and the second part.

10. An electronic device, comprising:
an electrochemical device, wherein the electrochemical device comprises an electrode assembly;

wherein the electrode assembly comprises a negative electrode plate, a positive electrode plate, and a separator, and the negative electrode plate, the separator, and the positive electrode plate are stacked and wound;

the negative electrode plate comprises a negative current collector, the negative current collector comprises a first part and a second part, and the first part and the second part are sequentially connected in a winding direction;

a first negative active material layer is disposed on one side of the first part, and no negative active material layer is disposed on the other side;

a second negative active material layer and a third negative active material layer are disposed on two sides of the second part respectively, and the first negative active material layer and the second negative active material layer are located on an identical side of the negative current collector;

the positive electrode plate comprises a positive current collector, the positive current collector comprises a third part and a fourth part, a first positive active material layer is disposed on the third part, a second positive active material layer is disposed on the fourth part, the first positive active material layer faces the first negative active material layer, and the second positive active material layer faces the second negative active material layer;

a ratio of a capacity per unit area of the first negative active material layer to a capacity per unit area of the first positive active material layer is $CB_1$, a ratio of a capacity per unit area of the second negative active material layer to a capacity per unit area of the second positive active material layer is $CB_2$, and $CB_1$ is greater than $CB_2$.

11. The electronic device according to claim 10, wherein the capacity per unit area of the first positive active material layer is less than the capacity per unit area of the second positive active material layer.

12. The electronic device according to claim 10, wherein the capacity per unit area of the first negative active material layer is greater than the capacity per unit area of the second negative active material layer.

13. The electronic device according to claim 12, wherein the first positive active material layer further comprises the second positive active material.

14. The electronic device according to claim 10, wherein the first negative active material layer comprises a first negative active material, the second negative active material layer comprises a second negative active material, and a specific capacity of the first negative active material is greater than a specific capacity of the second negative active material.

15. The electronic device according to claim 14, wherein the first negative active material layer further comprises the second negative active material.

16. The electronic device according to claim 10, wherein the positive current collector further comprises a fifth part, the fourth part is located between the third part and the fifth part, no positive active material layer is disposed on the fifth part, and the fifth part is located on an outermost circle of the electrode assembly.

17. The electronic device according to claim 10, wherein the negative current collector further comprises a sixth part, no negative active material layer is disposed on the sixth part, and the first part is located between the sixth part and the second part.

\* \* \* \* \*